United States Patent [19]

Meyer

[11] 4,059,301

[45] Nov. 22, 1977

[54] MOLDING RETAINER

[75] Inventor: Engelbert Anthony Meyer, Bloomfield Hills, Mich.

[73] Assignee: USM Corporation, Boston, Mass.

[21] Appl. No.: 691,283

[22] Filed: June 1, 1976

[51] Int. Cl.$^2$ .......................................... B60R 19/00
[52] U.S. Cl. .................................... 293/62; 293/99; 24/73 BC
[58] Field of Search ................. 52/716, 717, 718, 511; 193/60, 62, 63, 69 R, 70, 71, 96, 99, DIG. 3; 24/73 R, 73 B, 73 BC, 73 BP, 73 C, 73 CM, 73 D, 73 FA, 73 FT, 73 HS, 73 MF, 73 SB

[56] References Cited

U.S. PATENT DOCUMENTS

| | | | |
|---|---|---|---|
| 2,093,734 | 9/1937 | Place | 24/73 MF |
| 2,174,252 | 9/1939 | Altmyer | 293/62 |
| 2,187,952 | 1/1940 | Rusche | 293/62 |
| 2,677,862 | 5/1954 | Flora | 24/73 BC |
| 2,820,270 | 1/1958 | Scott | 24/73 BC |
| 3,501,186 | 3/1970 | Wilcox | 52/718 |

Primary Examiner—Trygve M. Blix
Assistant Examiner—D. W. Keen
Attorney, Agent, or Firm—Aubrey C. Brine; Richard B. Megley; Vincent A. White

[57] ABSTRACT

A device is provided for resiliently retaining an end portion of a decorative trim molding onto an automobile body panel wherein the molding is aligned with a similar molding on a bumper member, the bumper member being mounted for movement relative to the automobile body, on impact. The device allows the end portion of the molding member to move outwardly from the body a distance to allow the aligned molding on the bumper to move past it, thereby preventing buckling of the body panel molding. The device is effective to return the molding to the aligned position on the body after a plurality of such impacts.

11 Claims, 8 Drawing Figures

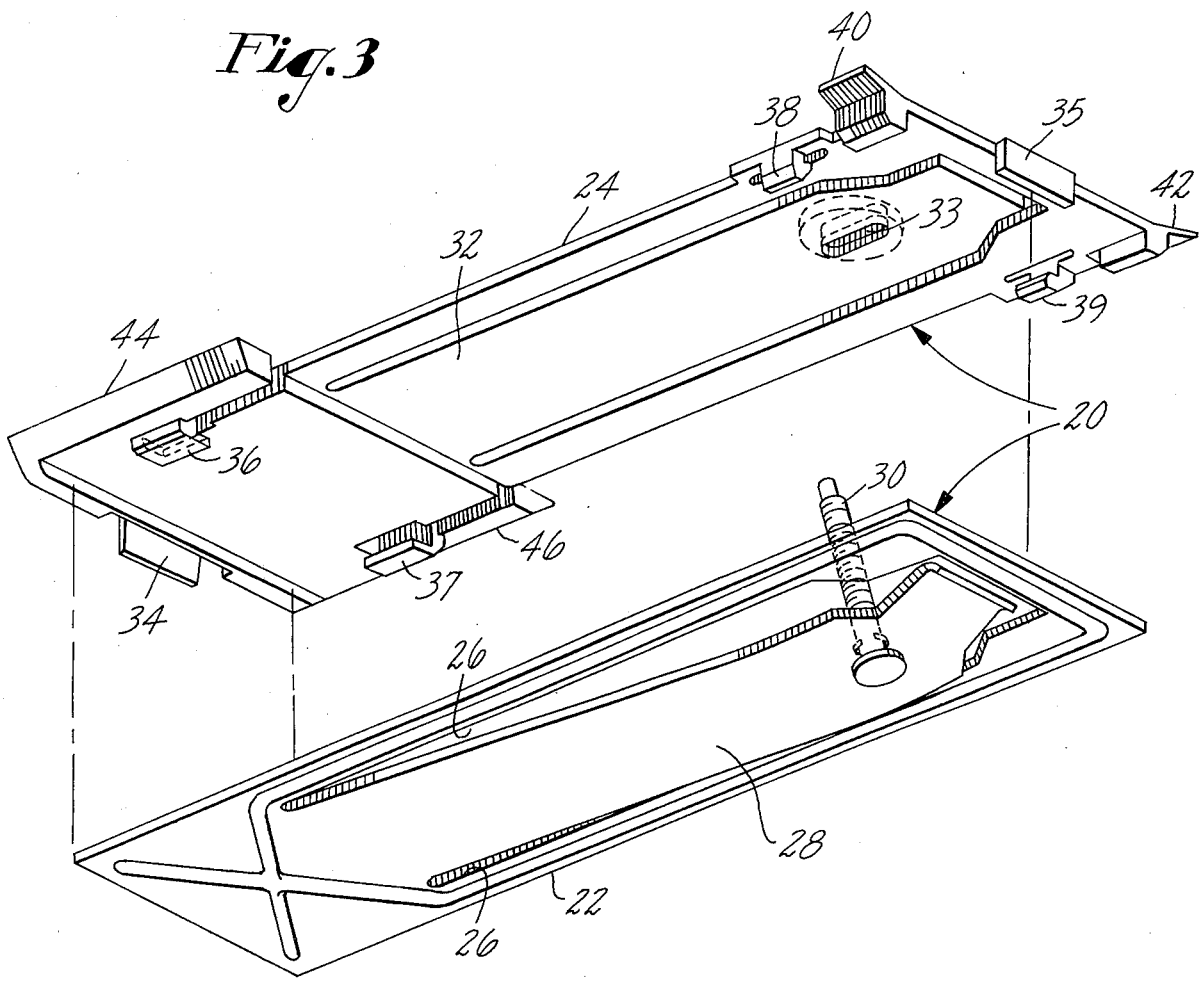
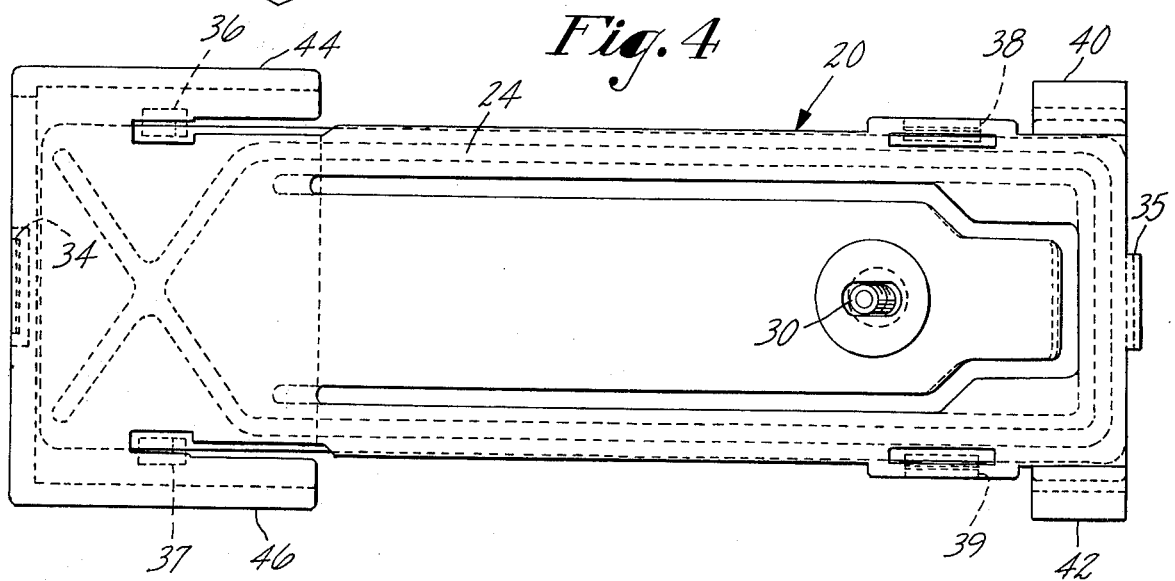

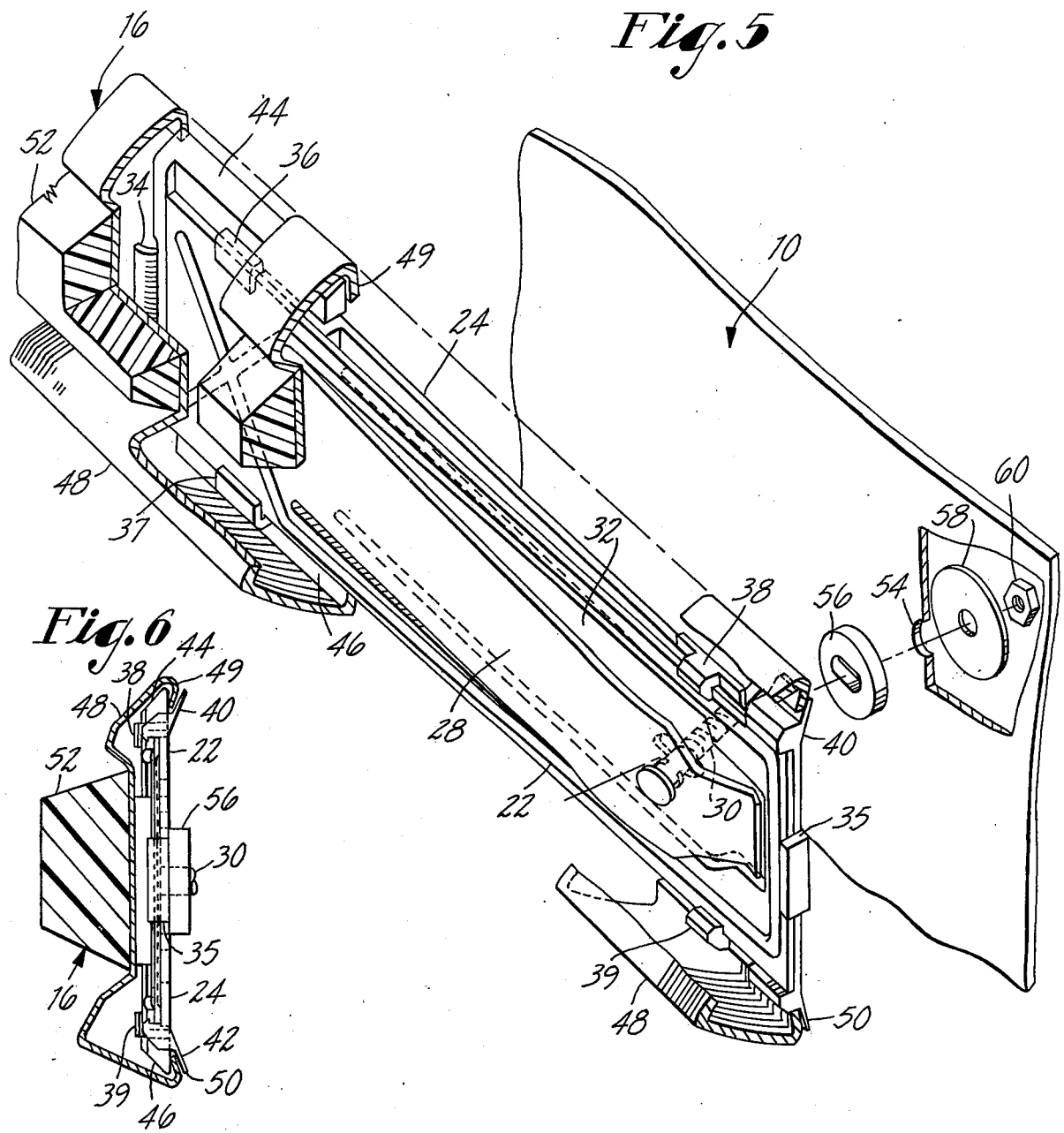

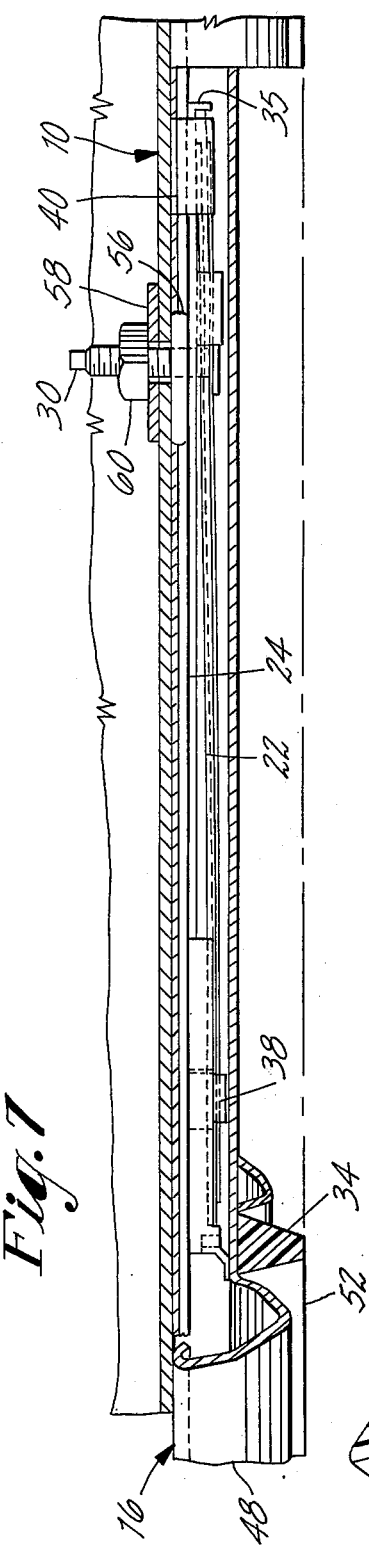
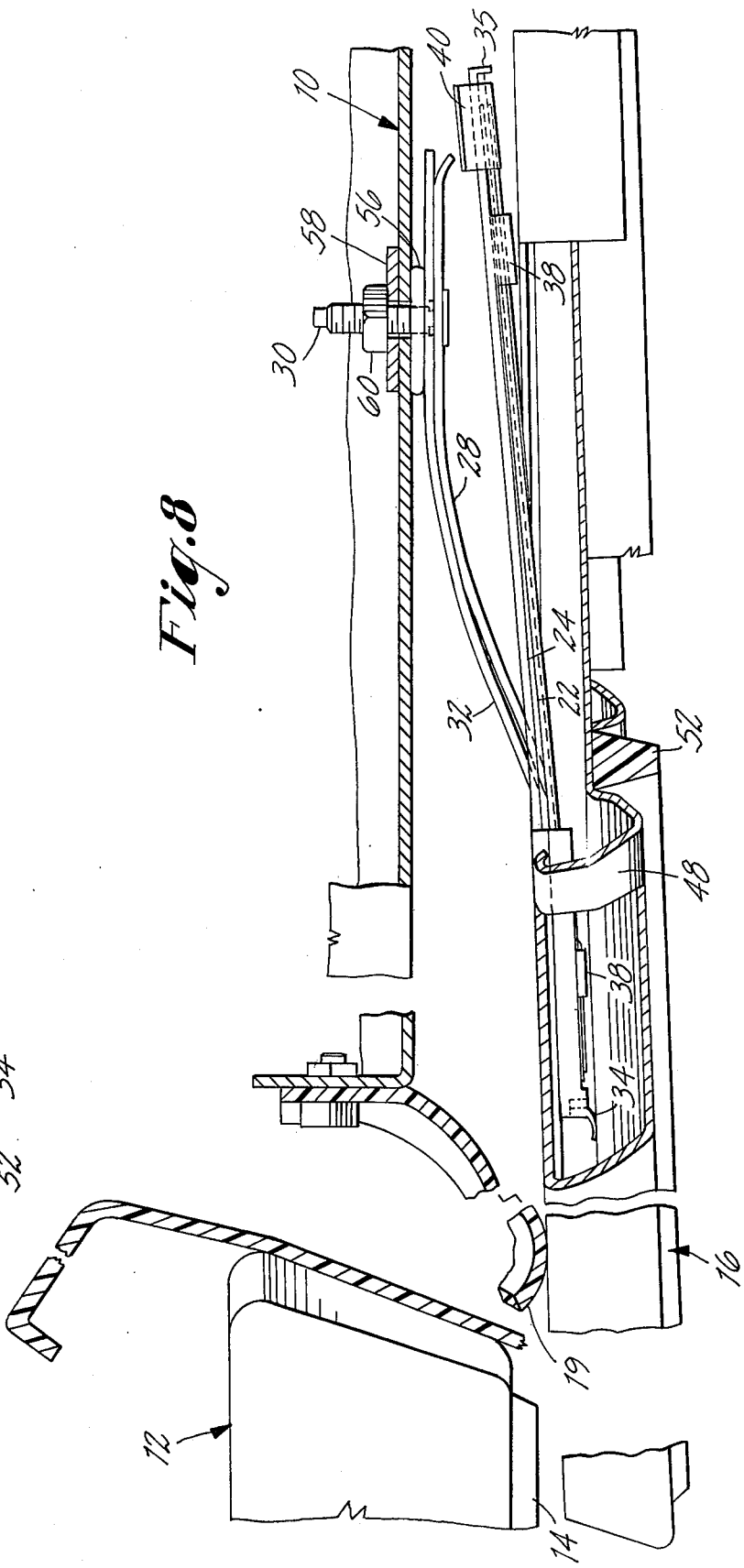

MOLDING RETAINER

BACKGROUND OF THE INVENTION

The present invention relates to a device for resiliently retaining the end portion of a decorative trim molding onto an automobile body panel and more particularly, a clip for retaining the end of a molding adjacent an automobile body panel which allows lateral movement of the molding away from the panel, and returns the molding to its original position.

In modern automobile construction, it is common practice to provide bumper arrangements, both in the front and rear of the automobile which blend into the body structure and give the appearance of a unitary structure at the points where the bumpers meet the adjacent panels of the vehicle. In order to accomplish this, automobile designers have aligned the decorative molding, which is attached to the body panels with a similar decorative molding on the bumper, thus giving the appearance of a unitary structure at the point where the bumper and the panel merge to form the body of the vehicle.

In recent years, automobile makers have turned to resiliently supporting the bumper on the vehicle in order to meet certain safety requirements and standards. In general, the bumper arrangement now provided on an automobile includes a support for the bumper which allows the bumper to move inwardly relative to the automobile body on impact. Automobile manufacturers are, therefore, forced to substitute resilient material, such as plastic, between the bumper and body panels in place of sheet metal, such that the body lines at the intersection of the bumper with the body panel still retain a pleasing appearance, yet do not buckle when the bumper is moved inwardly toward the body on impact.

However, so far as trim mold is concerned, heretofore, it has been necessary to end the trim molding at the end of the metal panels on the vehicle body and omit any trim portion overlying the plastic or resilient material which bridges the gap between the vehicle bumper, and the metal panel of the vehicle body.

It is, therefore, the object of the present invention to provide a device which is effective to allow the trim molding of a vehicle body to be extended to abutting relation with a similar trim molding on a vehicle bumper assembly.

It is a further object of the invention to provide a novel device for resiliently retaining an end portion of a molding onto an automobile body panel which allows the end portion of the molding member to be moved outwardly on bumper impact, from the body to allow the aligned molding on the bumper to move past it and which is effective to retain the molding to the aligned position on the body after a plurality of such movements.

SUMMARY OF THE INVENTION

The above objects and other objects which will become apparent as the description proceeds, are accomplished by providing for use with an automobile body and bumper assembly wherein relative movement takes place between a body panel and bumper, each of which carries a portion of an aligned molding thereon, a resilient member for receiving a molding on the body panel in engagement therewith near the molding end adjacent the aligned molding portion on the bumper and means affixing the resilient member to the automobile body panel. Movement of the bumper relative to the body is effective to cause the body molding to move away from the body by causing flexure of the member. The device for resiliently retaining the end portion of the molding onto the panel generally comprises a body portion having a width less than that of the molding and a length extending along a portion of the molding length and the means for engaging the body portion onto the molding with the device disposed between the molding and the panel. The device further comprises a resilient tongue affixed to the body portion near the end portion of the molding and extending along the portion of the molding length and means disposed near the distal end of the tongue for affixing the tongue to the panel.

BRIEF DESCRIPTION OF THE DRAWING

For a more complete understanding of the invention, reference should be made to the following description taken in conjunction with the accompanying drawing wherein:

FIG. 3 is an exploded perspective view showing elements of the invention;

FIG. 4 is a plan view showing details of the structure of FIG. 3;

FIG. 5 is an exploded perspective view showing the structure of FIGS. 3 and 4 employed in conjunction with a molding and automobile panel;

FIG. 6 is a cross-sectional view showing the structure of FIG. 5 assembled;

FIG. 7 is a top plan view, partially in section, showing the structure of FIGS. 5 and 6; and FIG. 8 is a top plan view, partially in section, showing the structure of FIG. 7 during impact of the bumper with an object.

DESCRIPTION OF THE PREFERRED EMBODIMENT

Figure 1:
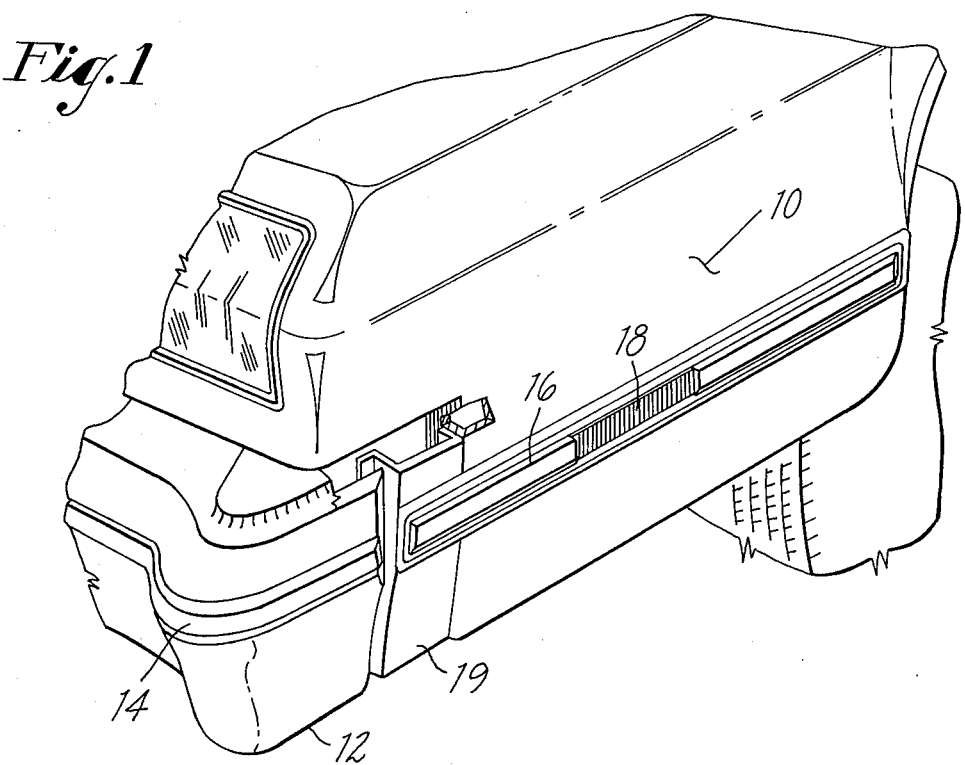
FIG. 1 is a fragmentary perspective view having portions in section showing an automobile body wherein the bumper is movable relative to the body, and in which the present invention is employed.
Figure 2:
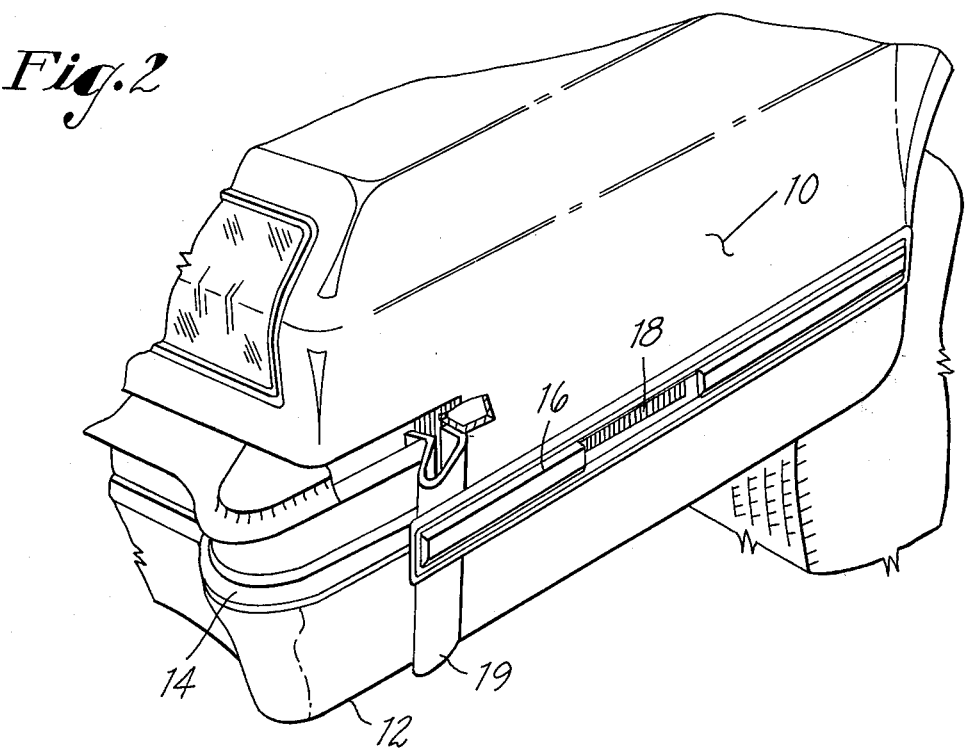
FIG. 2 is a fragmentary perspective view similar to FIG. 1 showing the automobile body and bumper during impact caused by collision of the bumper with an object.

Referring now to the drawing, and in particular, FIGS. 1 and 2, there is shown a portion of the right rear section of an automobile having a body panel 10 and bumper 12. The bumper 12 is mounted onto the automobile frame by shock-absorbing means, which may be of any type well known in the art, providing for the bumper to move inwardly toward the vehicle body (and the panel 10) upon impact as shown in FIG. 2, and to return to its normal position upon release of the impact force, as shown in FIG. 1.

As will be observed in FIGS. 1 and 2, the bumper 12 is provided with a trim molding 14 which is fixed to the bumper in alignment with a similar trim molding 16 mounted on the panel 10. Although the trim molding 16 could be of continuous cross-section, in the present embodiment, it has a portion removed to reveal a reflector or light source 18 mounted on the panel.

In order to provide a smooth appearance between the bumper 12 and the panel 10, a channel-shaped transition member 19 of polyurethane, or other flexible plastic material, is mounted between the panel 10 and the bumper 12, and is generally of the same color as that of the automobile body panel 10. As will be noted in FIG. 2, the member 19 is mounted to flex when the bumper 12 is moved inwardly toward the panel 10, but returns to its original configuration (as shown in FIG. 1) when the force of impact is removed from the bumper.

In order to locate the molding 16 in close relation to the bumper 12 and, thereby, to prevent an unsightly gap occuring between the otherwise continuous molding members, the molding 16 is mounted such that it deflects away from the body panel 10 when the bumper 12 is forced inwardly upon impact, and returns to its original position when the force of impact is removed.

To provide a flexible mounting for the molding 16, there is provided a retaining device 20. The retaining device 20, as best shown in FIGS. 3 and 4, comprises one resilient member 22 formed of metallic material, such as spring steel. In the present embodiment, the member 22 is formed of SAE 1050 spring steel material, 0.041 inches thick. The device 20 further comprises a second resilient member 24, which is of non-metallic material. In the embodiment shown, the member 24 is manufactured of type 6-6 nylon and is of similar configuration to the member 22, in plan form.

The metallic member 22 has a continuous slot 26 extending from adjacent one end of the member to a point near the opposite end to form a resilient tongue 28. A threaded male fastener 30 is affixed at a point near the distal end of the tongue 28, and the tongue is curved outwardly from its point of origin which lies in the plane of periphery of the member 22 to the distal end of the tongue, which also lies substantially in the plane of the periphery of the member 22.

Referring still to FIGS. 3 and 4, the non-metallic member 24 is similarly formed to provide a tongue 32 having substantially the same plan form as the tongue 28. An elongated opening 33 is provided in the tongue 32 for receiving the fastener 30 therethrough when the members 22 and 24 are assembled to form the retainer device 20. A pair of upstanding tabs 34 and 35 are formed at opposite ends of the member 24 and four substantially L-shaped tabs 36, 37, 38 and 39 are formed in pairs adjacent either end of the member 24 to receive the resilient metallic member 22 in interfitting engagement, and thus to form the retaining device 20.

At that portion of the member 24 near the distal end of the tongue 32, there is located a pair of outwardly extending land elements 40 and 42 on which the edges of a trim strip are supported when the retaining device 20 is in the assembled position. At the opposite end of the member 24, a pair of outwardly extending flanges 44 and 46 provide means for retaining a flanged trim strip onto that end of the device 20. Both the lands 40 and 42 and the flanges 44 and 46 extend substantially the same distance outwardly from the member 24, the flanges being retained within the trim strip and the land being retained adjacent the panel 10, to support the strip adjacent the panel.

As shown in FIG. 4, initial assembly of the retaining device 20 is achieved by locating the resilient metallic member 22 under the L-shaped tabs 36 through 39 and within the bounds of the upstanding tabs 34 and 35. Ease of assembly is accomplished due to the flexibility of the non-metallic resilient member 24, which may be manufactured of nylon as described, or other plastic material. It will be observed that the two members 22 and 24, when assembled to form the retaining device 20, are of substantially the same dimensions in plan form, with the exception of the outwarding extending lands 40,42 and the flanges 44 and 46.

Referring now to FIGS. 5 and 6, the retaining device 20 is shown assembled in engagement with the molding 16 as it is prepared for installation onto the automobile panel 10.

The trim strip 16, employed in the present embodiment, comprises a metallic member 48 having flanges 49 and 50 turned inwardly, and a decorative portion 52 which is of plastic material, and may be of a contrasting or similar color to that of the automobile body. It will be obvious, however, that any configuration of the trim strip may be employed with the present invention, the primary requirement being the provision of flanges or similar retaining means similar to the flanges 49 and 50.

As will be noted from FIGS. 5 and 6, the retaining device 20 is attached to the trim molding 16 by inserting the flanges 44 and 46 of the member 20 within the opening provided by the flanges 49 and 50 of the molding 16, with the lands 40 and 42 in engagement with the outer portions of the flanges 49 and 50.

To attach the retaining device 20, and the molding 16 secured thereto, to the automobile body panel 10, a hole 54 is drilled through the panel 10 and the fastener 30 is received therethrough. A sealing washer 56 is located between the retaining device 20 and the panel 10, and a metal washer 58 and nut 60 engage the fastener on the opposite side of the panel to firmly affix the retaining device and molding to the panel.

Referring now to FIGS. 7 and 8, it will be noted that in the assembled unstressed state, as in FIG. 7, the members 22 and 24 of the retaining device 20 are substantially parallel to the panel 10. That is, the curved portion of the tongue 28 is forced toward the panel 10 by virtue of the fastener 30 and nut 60 to cause a pre-tension in the tongue 28 which is effective substantially over the length of the tongue 28 to force the retaining device 20 and the molding 16 against the panel 10.

In FIG. 8, it will be seen that upon impact of an object with the bumper 12, the bumper moves inwardly toward the panel 10, with the resultant buckling of the transition member 19. In the embodiment shown, the outward buckling of the member 19 forces the molding 16 away from the body panel 10 and prevents buckling of the molding which would occur should the bumper 12 or its molding 14 contact the molding 16. It will be noted that movement of the molding 16 causes the tongue 28 of the resilient member 22 to be flexed away from the panel 10. The flexure takes place over the greater length of the retaining device 20 and therefore, there are no sharp bends produced in the molding 16, tending to buckle the molding. In fact, the molding 16, by virtue of the support provided at the end thereof, and the length over which it is moved away from the panel 10, is not subjected to sharp bending which would cause distortion or permanent injury to the molding 16.

When the load is removed from the bumper 12, the bumper will return to its original position, as will the transition member 19. The tongue 28, having a pre-stress applied to it in its original position shown in FIG. 7, serves to bring the trim strip 16 into the position shown in FIG. 7 and will continue to perform this function over a number of cycles.

In addition, the non-metallic resilient member 24 serves two functions, that of isolating the metallic member 22 from the metal panel 10 to prevent corrosion between the metallic elements, and further provides a non-metallic pad at the lands 40 and 42 and the flanges 44 and 46 which align the molding 16 with the device 20 and serve to protect the paint or finish of the panel 10 when the retaining device 20 and trim molding 16 snap back into the position shown in FIG. 7.

I claim:

1. In an automobile body and bumper assembly wherein relative movement takes place between a body panel and bumper, each of which carries a portion of an aligned molding thereon, the improvement comprising; a resilient member for receiving the molding on the body panel in engagement therewith near the body molding end adjacent the aligned molding portion on the bumper, and means affixing said resilient member to the automobile body panel whereby movement of the bumper relative to the body is effective to cause the body molding to move away from the body by causing flexure of said member.

2. The structure of claim 1 wherein said resilient member comprises a relatively thin sheet of metallic material extending along the length of said panel molding between said molding and said body panel, and wherein one end of said sheet is attached to said molding near a free end of said molding and the opposite end of said sheet is affixed to said body panel at a point spaced from said free end of said molding.

3. The structure of claim 2 wherein said thin sheet of metallic material is curved outwardly from a point in the area of attachment to said molding to a point in the area of said means for affixing said resilient member to said body panel whereby said resilient member is pre-stressed to force said molding against said body panel with said molding attached to said resilient member and said resilient member affixed to said body panel.

4. The structure of claim 2 wherein said sheet of metallic material is formed of spring steel.

5. The structure of claim 2 which further comprises a thin sheet of non-metallic material located between said thin sheet of metallic material and said body panel.

6. The structure of claim 5 wherein said sheet on non-metallic material is attached to said sheet of metallic material, and comprises means for attaching said panel molding to said resilient member in the form of a pair of outwardly extending opposed flanges for engaging the molding near a free end of the molding.

7. The structure of claim 6 wherein said sheet of non-metallic material further comprises a pair of laterally extending lands, each land extending beyond the width of said metallic sheet and supporting the lateral edges of said molding whereby said resilient member is retained in alignment with said molding.

8. The structure of claim 7 wherein said non-metallic sheet comprises a body portion having substantially the same shape in plan form as said metallic sheet with said flanges and said bands extending beyond said non-metallic body portion.

9. The structure of claim 8 wherein said non-metallic sheet is a unitary structure formed of resilient plastic material.

10. A member for resiliently retaining an end portion of a molding onto a panel comprising a thin sheet of metallic material for extending along the length of said panel molding between the molding and the body panel, means disposed at one end of said sheet for attachment of said sheet to the molding near a free end of said molding, a slot formed about a portion near the periphery of said sheet to form a resilient tongue having a free end near the opposite end of said sheet from said means for attachment to said molding, said tongue having a portion thereof formed to extend outwardly of the panel from a point in the area of attachment to said molding, to a point adjacent the free end of the tongue, and means for attaching said tongue to said panel near the free end of said tongue whereby said resilient member is pre-stressed to force said molding against said panel with said molding attached to said resilient member and said tongue affixed to said panel.

11. The device of claim 10 wherein said sheet of metallic material is formed of spring steel.

* * * * *